United States Patent
Krutz et al.

(10) Patent No.: US 12,483,808 B2
(45) Date of Patent: Nov. 25, 2025

(54) TDI LINE SENSOR AND METHOD FOR OPERATING A TDI LINE SENSOR

(71) Applicant: Deutsches Zentrum für Luft—und Raumfahrt e.V., Bonn (DE)

(72) Inventors: David Krutz, Bonn (DE); Kristian Manthey, Bonn (DE)

(73) Assignee: Deutsches Zentrum für Luft—und Raumfahrt e.V., Bonn (DE)

( * ) Notice: Subject to any disclaimer, the term of this patent is extended or adjusted under 35 U.S.C. 154(b) by 192 days.

(21) Appl. No.: 18/571,287

(22) PCT Filed: Jun. 10, 2022

(86) PCT No.: PCT/EP2022/065810
§ 371 (c)(1),
(2) Date: Dec. 18, 2023

(87) PCT Pub. No.: WO2022/263311
PCT Pub. Date: Dec. 22, 2022

(65) Prior Publication Data
US 2024/0284068 A1    Aug. 22, 2024

(30) Foreign Application Priority Data

Jun. 18, 2021   (DE) .................... 10 2021 206 280.6

(51) Int. Cl.
*H04N 25/711* (2023.01)
*H04N 25/701* (2023.01)
*H04N 25/71* (2023.01)

(52) U.S. Cl.
CPC ......... *H04N 25/711* (2023.01); *H04N 25/701* (2023.01); *H04N 25/745* (2023.01)

(58) Field of Classification Search
CPC .. H04N 25/701; H04N 25/711; H04N 25/745; H04N 25/768
(Continued)

(56) References Cited

U.S. PATENT DOCUMENTS 4,382,267 A  *  5/1983  Angle ................. H04N 25/711
                                                348/298
2002/0191094 A1  12/2002  Curtis et al.
(Continued)

FOREIGN PATENT DOCUMENTS

DE   102007016176 B4   8/2015
FR      2827043 A1  *  1/2003  ......... G01N 21/8851
JP     2005269060 A      9/2005

OTHER PUBLICATIONS

Boulenc, Pierre; Robbelein, Jo; Wu, Linkun et al.: High speed TDI embedded CCD in CMOS sensor. International Conference on Space Optics, ICSO 2016, Biarritz, France, Oct. 18-21, 2016. Proc. of SPIE vol. 10562, pp. 105622P-1-105622P-7.
(Continued)

*Primary Examiner* — Anthony J Daniels
(74) *Attorney, Agent, or Firm* — Bonini IP Law, LLC; Frank J. Bonini, Jr.

(57) ABSTRACT

An operating method and a TDI line sensor having n TDI lines, at least one readout electronics unit and a circuit arrangement. The period of the CCD control signals is an integer multiple of a system period, with all TDI lines controlled with the same CCD control signal. The TDI line sensor is configured such that an optimum period of the CCD control signals is calculated on the basis of the relative velocity, wherein the optimum period is not an integer multiple of the system period, wherein the period of the CCD control signals is changed as an integer multiple of the system period during the integration over all n TDI lines so that the arithmetic mean of the period of the CCD control signals over the n integration steps corresponds to the optimum period.

20 Claims, 6 Drawing Sheets

Figure 2A:
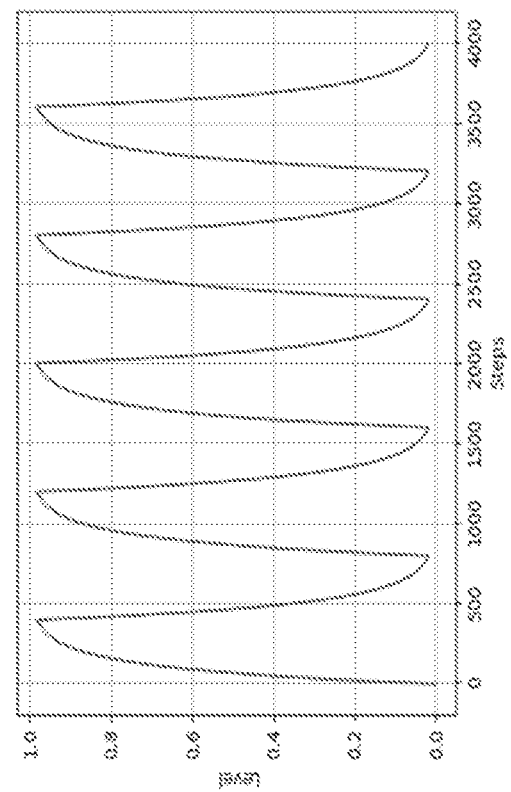

(58) Field of Classification Search
USPC .......................................................... 348/295
See application file for complete search history.

(56) References Cited

U.S. PATENT DOCUMENTS

2006/0103725 A1  5/2006  Brown et al.
2007/0064135 A1  3/2007  Brown et al.

OTHER PUBLICATIONS

Boulenc, Pierre; Robbelein, Jo; Wu, Linkun et al.: High Speed Backside Illuminated TDI CCD-in-CMOS-Sensor. 2017 International Image Sensor Workshop, IISW 2017, May 30-Jun. 2, 2017, Hiroshima, Japan, Session 10, Paper R50. Conference Proceedings, pp. 364-367.
Pratlong, Jérome; Tsiolis, Georgios; Lee, Hyun Jung et al.: High-resolution charge domain TDI-CMOS image sensor for Earth observation. Proc. SPIE 10785, Sensors, Systems, and Next-Generation Satellites XXII, 107850X (Sep. 25, 2018).

* cited by examiner

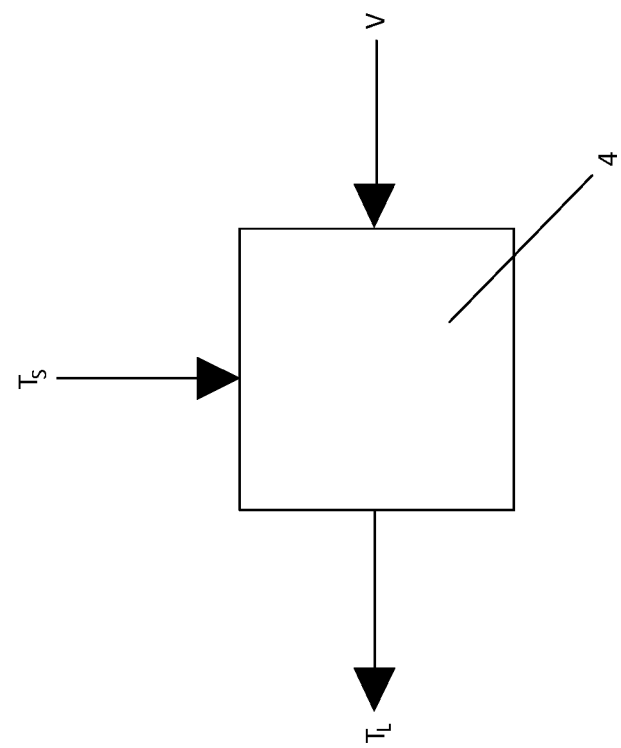
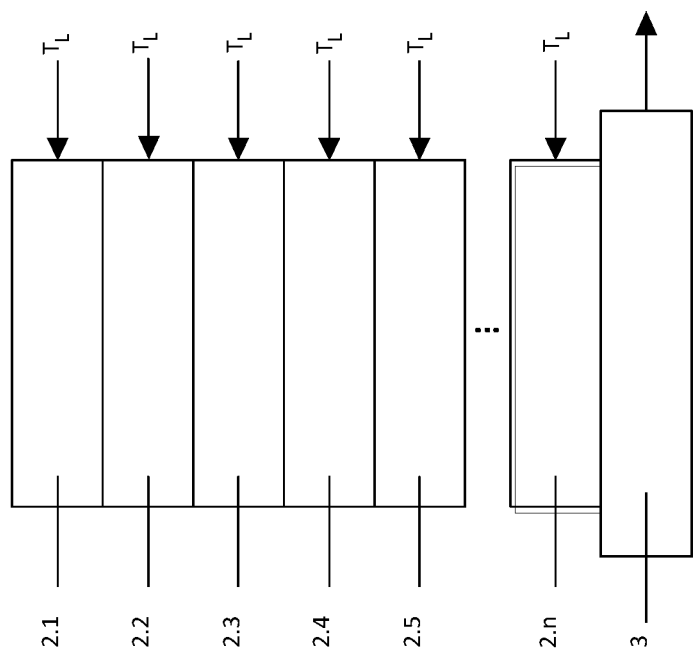
Fig. 1

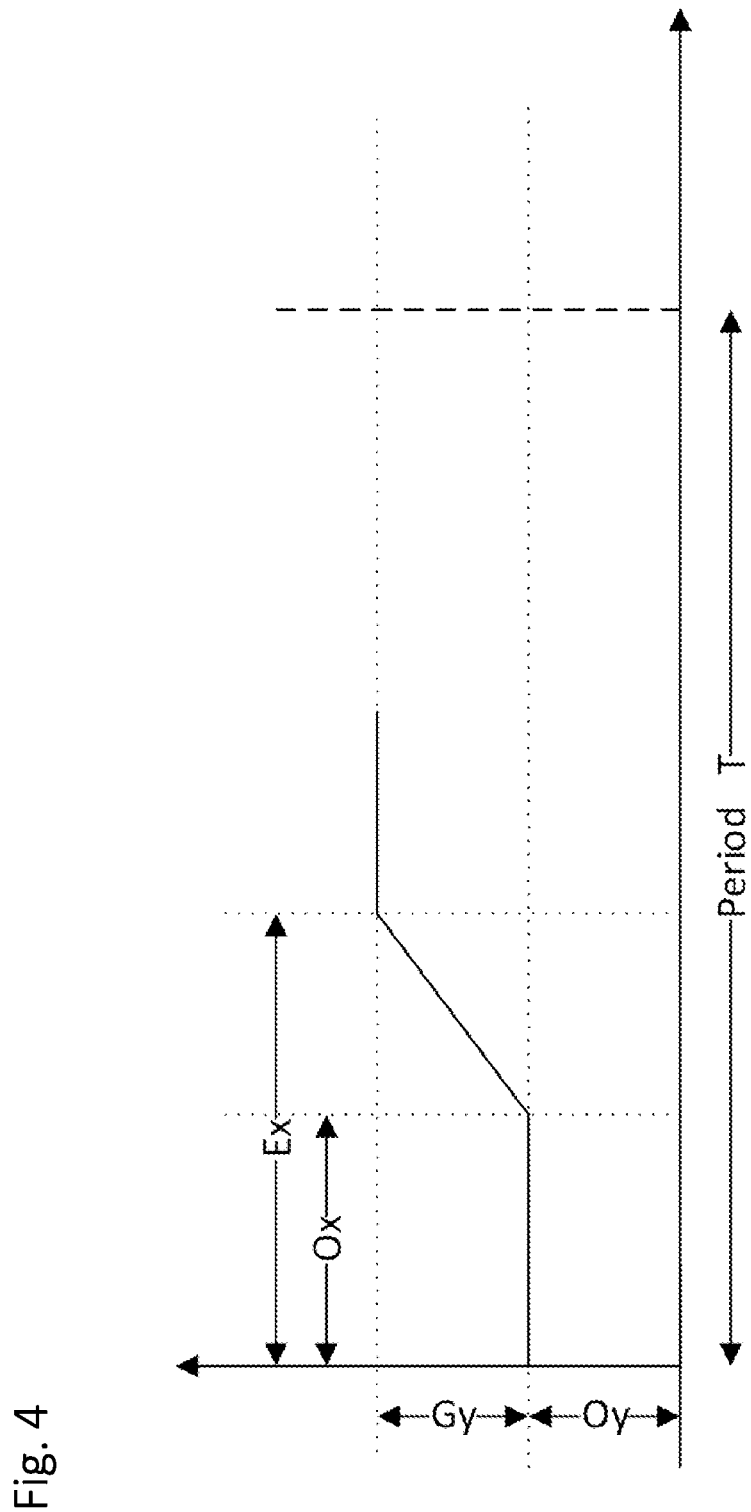

TDI LINE SENSOR AND METHOD FOR OPERATING A TDI LINE SENSOR

BACKGROUND OF THE INVENTION

1. Field of the Invention

The invention relates to a TDI line sensor and a method for operating a TDI line sensor.

2. Brief Description of the Related Art

Especially in the field of high-resolution satellite remote sensing, TDI CCD sensors are currently the best technology to meet the requirements of low ground resolution, high scanning speed and high signal-to-noise behavior. An important aspect here is time-delay integration (TDI), i.e., the synchronous shifting of the charges within the CCD to compensate for the movement of the satellite. Until now, TDI CCD sensors have been realized using NMOS technology, although new approaches using CMOS technology are opening up new possibilities in terms of integration density and sensor functionality. The sensor is controlled by CCD control signals. The CCD control signals include, among others: Shift clocks for the TDI charge transport as well as clocks for the CCD readout (reset, transfer gate, summing well). These signals are generated in a digital unit that runs with a system period. The CCD control signals have a periodicity here, which means that continuous lines may be recorded. The period length is usually in the us range here, whereas the system period, derived from the clock frequency of the system (system frequency), is in the 10 ns range. The period of the CCD control signals is a multiple here of the system period. Synchronized movement is ensured here by adjusting the period of the CCD control signals. If the relative speed changes, for example because the satellite changes its orbit, the control signal is tracked, i.e., its period is changed. The edge or edge steepness is rigidly defined by an electrical circuit (e.g., an RC filter).

SUMMARY OF THE INVENTION

The invention addresses the technical problem of creating an improved TDI line sensor and providing a corresponding method for operating a TDI line sensor.

For this purpose, the TDI line sensor has n TDI lines, at least one readout electronics unit and a circuit arrangement for generating CCD control signals for the TDI lines, wherein the period of the CCD control signals are integer multiples of the system period. All TDI lines are controlled simultaneously here with the same CCD control signal. The TDI line sensor is configured such that an optimum period of the CCD control signals is calculated based on the relative speed in relation to an object to be observed, wherein the optimum period is not an integer multiple of the system period, wherein the period of the CCD control signals is changed as an integer multiple of the system period during the integration over all n TDI lines such that the arithmetic mean of the period of the CCD control signals over the n integration steps corresponds to the optimum period, wherein the change in the period of the CCD control signals over the n integration steps is limited to one system period. This significantly improves the achievable image quality, particularly with many TDI lines and small periods.

In one embodiment, the TDI line sensor is configured so as to calculate a period pattern over x integration steps, wherein the arithmetic mean value over the x integration steps corresponds to the optimum period, wherein the period pattern is applied repeatedly over the n integration steps. The following applies here: x≤n. If, for example, the calculation of the optimum period shows that this should be 1,000.25 clock lengths of the system period, a CCD control signal with 1,000 clock lengths of the system period is generated three times, for example, and then a CCD control signal with 1,001 clock lengths of the system period is generated. In this case, X is 4. This pattern is then repeated. With 256 TDI lines, it is repeated 64 times correspondingly.

In a further embodiment, the circuit arrangement is configured to additionally change an edge steepness of the CCD control signals, wherein the edge steepness is reduced as the period increases. This further improves the image quality, as higher-contrast partial images are generated.

The adjustment of the edge steepness may also be used with TDI sensors from the prior art, in which the period of the CCD control signals is constant over the n integration steps, but the respective period changes depending on the relative speed.

In one embodiment, the circuit arrangement is configured so as to generate linear edges (ramps), which has further advantages compared to the exponential edges (due to the RC members) from the prior art, in particular with regard to tracking the edge steepness.

In one embodiment, the circuit arrangement is configured as an FPGA or ASIC so that the tracking is very fast. The CCD control signals are therefore calculated in pure hardware without a microprocessor.

In a further embodiment, a digital-to-analog converter is arranged at the output of the circuit arrangement. The digital-to-analog converter may be configured as a separate component or integrated in the FPGA or ASIC.

BRIEF DESCRIPTION OF THE DRAWING FIGURES

Figure 2B:
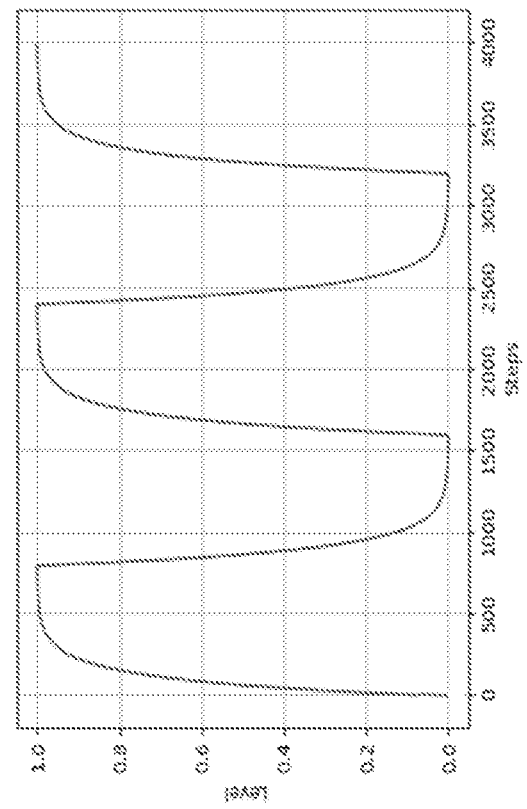
Figure 3B:
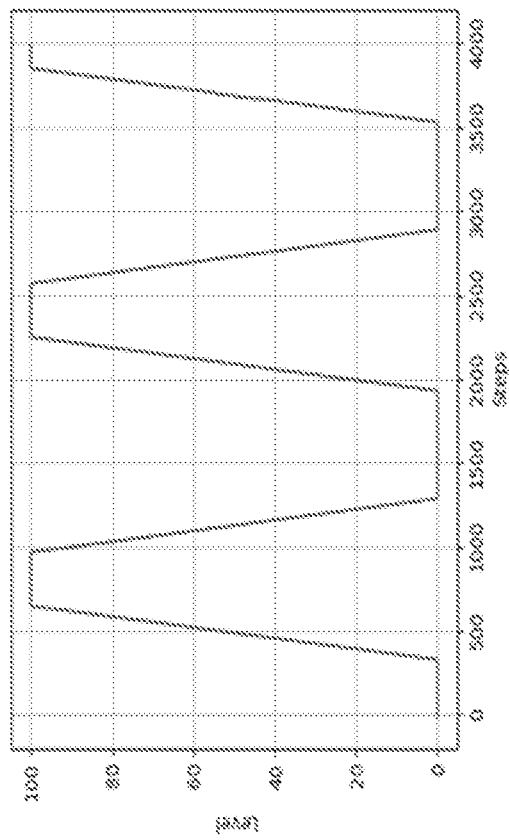
Figure 3A:
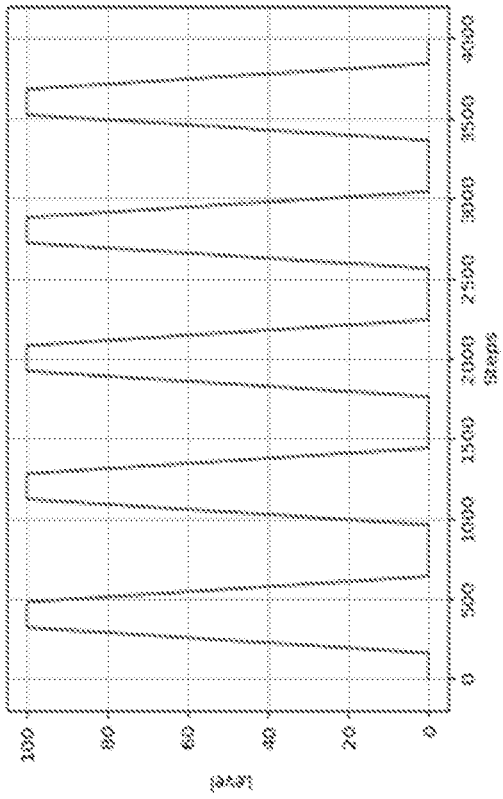
Figure 5:
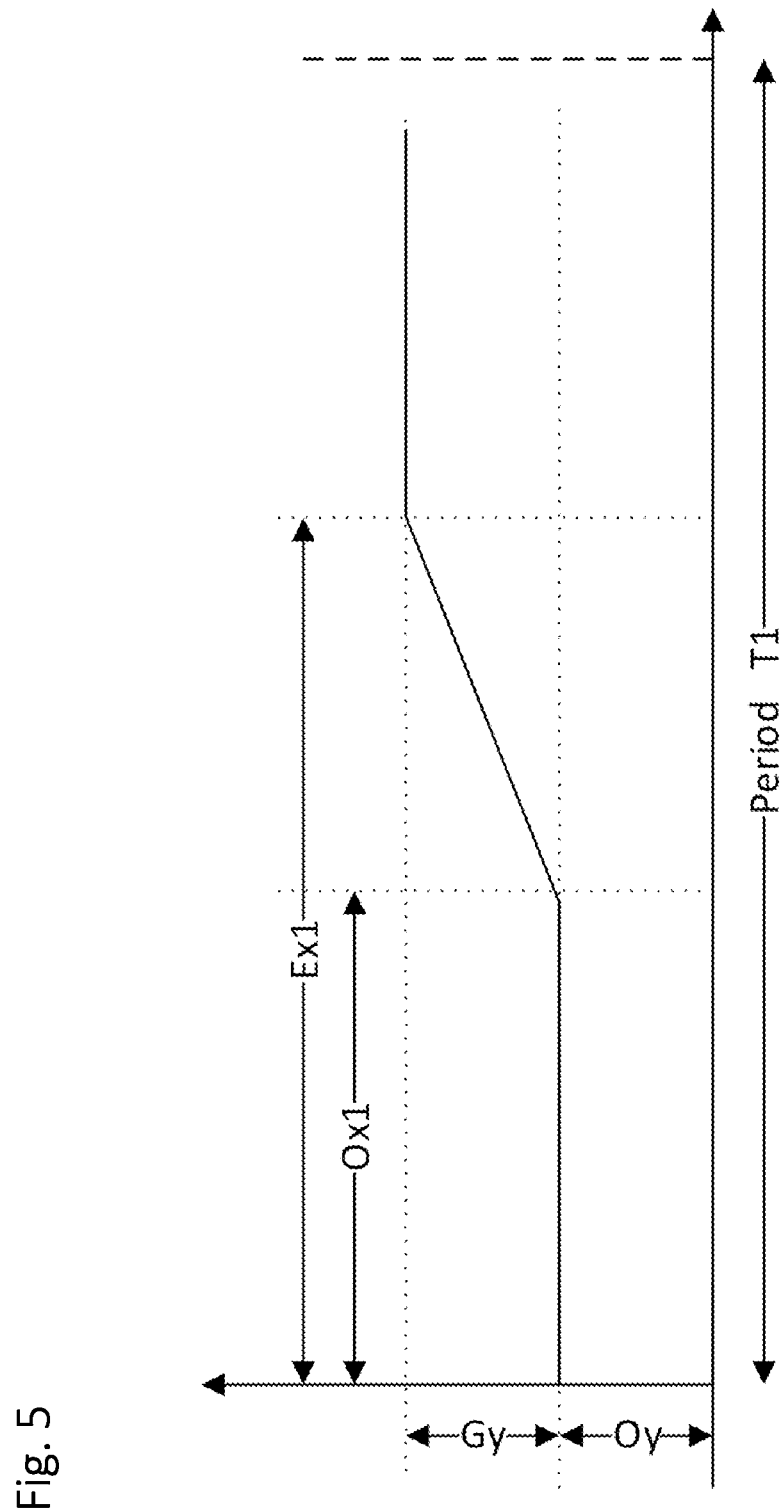
Figure 6:
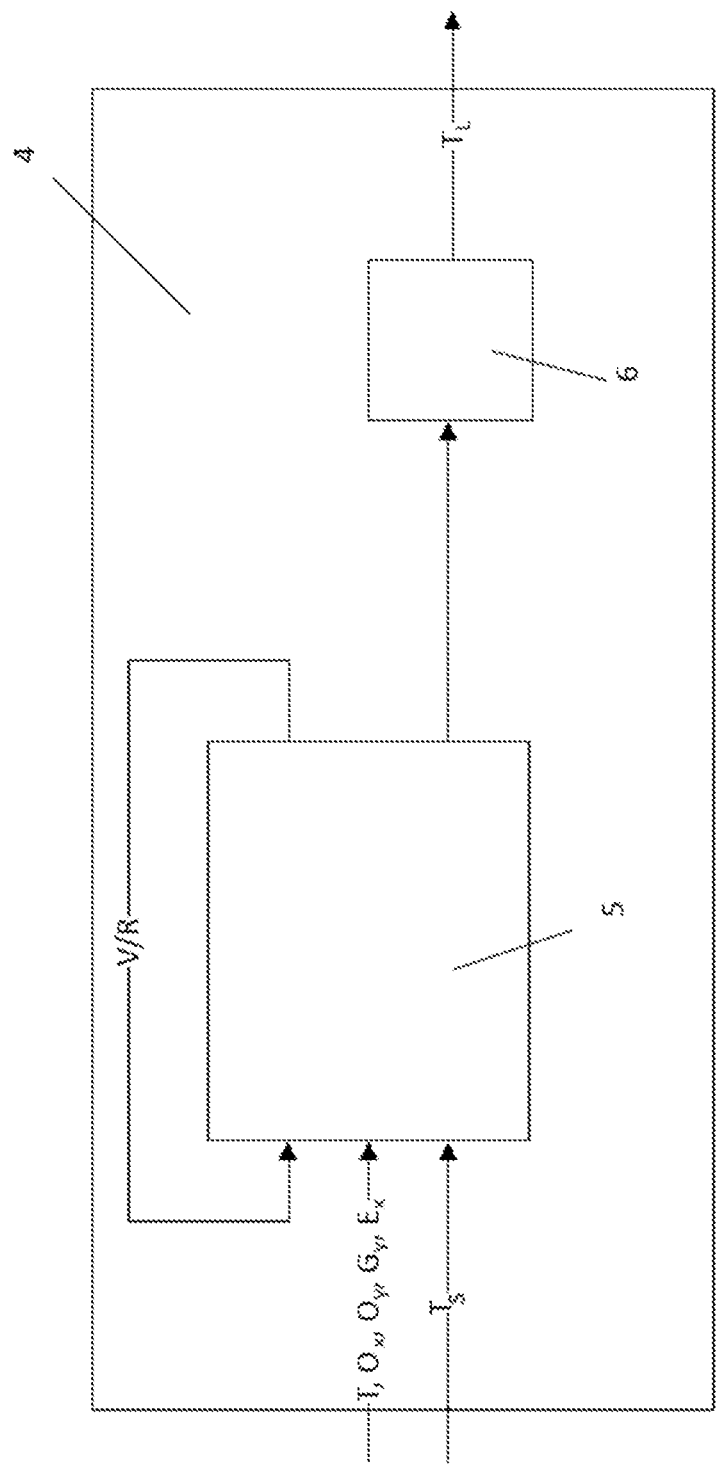

The invention is explained in greater detail below with reference to a preferred exemplary embodiment. The figures show:

FIG. 1 a highly simplified block diagram of a TDI line sensor,

FIG. 2a a curve of a control signal for a first relative speed (prior art),

FIG. 2b a curve of a control signal for a second relative speed (prior art),

FIG. 3a a curve of a control signal for a first relative speed according to the invention, FIG. 3b a curve of a control signal for a second relative speed according to the invention, FIG. 4 a detailed representation of part of a control signal, FIG. 5 a detailed representation of a part of a control signal at a changed relative speed and FIG. 6 a schematic representation of a circuit arrangement for generating the control signals.

DETAILED DESCRIPTION OF THE INVENTION

FIG. 1 shows a highly simplified block diagram of a TDI line sensor 1, which has n TDI lines 2.1-2.n, at least one readout electronics unit 3 and a circuit arrangement 4 for generating CCD control signals TL (hereinafter referred to also as control signals for short) for the n TDI lines 2.1-2.n, wherein the circuit arrangement 4 is operated at a system frequency $f_S$ or system period $T_S$ and receives a relative velocity V as an input variable.

Before the invention is explained in greater detail, the prior art will first be briefly explained with reference to FIGS. 2a and 2b. In FIG. 2a, a control signal for a first relative speed is shown, wherein the steps plotted on the x-axis represent cycle lengths of the system period $T_S$. Here, the edges of the control signal rise and fall exponentially (due to the RC filters). FIG. 2b shows the control signal for a second relative speed that is lower than the first relative speed, so that the period of the control signal is longer, wherein, however, the steepness of the edges remains the same.

FIGS. 3a and 3b show the control signals in an embodiment according to the invention, wherein on the one hand the edges rise and fall linearly and on the other hand the edges rise and fall less steeply for longer periods of the control signals.

An algorithm implemented in the circuit arrangement is intended to generate the curve shape itself as a function of the period T of the control signal, which is now explained with reference to FIGS. 4 and 5. If the period changes from T to T1, Ox and Ex should adapt accordingly. The period T represents the length in cycles of the system period TS. This period T does not have to be an integer. A fixed-point representation is permitted, which generates a digital jitter that greatly improves the performance of the system in the context of de-synchronization, which will be explained in more detail later. Oy is the start level in digital number (DN). Gy is the change in level over the ramp time in DN. Ox is the starting point of the ramp over the period. As the period may change, a relative measure must be defined here. Ox should have a fixed-point representation here with values in [0,1]. The start time is then the product of the period and this value. EX defines the end time of the ramp. Like Ox, this value is defined relative to the period, i.e., the value must be from [0,1]. The following applies $$Ex1 = \frac{T_1}{T} \cdot Ex \text{ and } Ox1 = \frac{T_1}{T} \cdot Ox.$$

The time axis is divided here into discrete units, the clocks, of the system period $T_S$. Only the case of a rising ramp is discussed here; the subsequent falling edge is covered by the same algorithm, but with adapted parameters.

The algorithm is distinguished by particularly good implementability in hardware structures, such as FPGA or ASIC. The basic structure is shown in FIG. 6. A new output value, the ramp value, must be calculated here for each clock unit. Due to the high speed and the implementation in hardware, real multiplications are not used in this algorithm. These would require a lot of space, i.e., area in the FPGA or ASIC, and would also reduce the speed. Multiplication and integer division with powers of 2 are permitted, as these do not represent operations in hardware due to the binary representation, i.e., they may be implemented entirely without any additional effort.

Period T, level Oy, level change Gy, Oy and Ex represent the five initialization values.

The following digital integer hardware representations are derived from these 5 values. Two bases must be defined here: Period_Basis and Point_Basis. These define the accuracy of the ramp display. In contrast to the initialization parameters, which may be changed at runtime, it is not possible to change the bases at runtime. These are permanently defined by the hardware. The calculation of these values also includes multiplication or division, which is acceptable, however, as these values only need to be calculated for the configuration. The calculation itself may be performed on a processor upstream of the CCD control.

$$Period\_N = Period * 2^\wedge Period\_Basis$$

$$StartPoint\_N = 2^\wedge Point\_Basis/Ox$$

$$StopPoint\_N = 2^\wedge Point\_Basis/\textit{StopPoint}$$

$$Level\_N = 2^\wedge Point\_Basis * Gy/(Ex-Ox)$$

The following variables are also required:

| Variable | Remark | Init value |
| --- | --- | --- |
| State | defines the current state (0, 1, 2) | 0 |
| Level | defines the current output value | 0 |
| ErrorPeriod | Residual error in the period | 0 |
| ErrorStart | Residual error at the starting point | 0 |
| ErrorStop | Residual error at the end point | 0 |
| ErrorLevel | Residual error in the level | 0 |

The output value Level is now calculated per cycle using the following algorithm:

```
ErrorPeriod += 2**Period_Basis
ErrorStart += StartPoint_N*2**Period_Basis
ErrorStop += StopPoint_N*2**Period_Basis
ErrorLevel += Level_N*2**Point_Basis
if state == 0:
   level = Oy
   if ErrorStart > Period_N*2**Point_Basis:
      ErrorLevel = 0
      state = 1
if state == 0 or state == 1:
   if ErrorStop > Period_N*2**Point_Basis:
      state = 2
      ErrorStop = 0
if state == 1:
   if ErrorLevel > Period_N*2**Period_Basis:
      ErrorLevel -= Period_N*2**Period_Basis
      level += 1
if state == 2:
   level = Oy+Gy
if ErrorPeriod > Period_N:
   ErrorPeriod -= Period_N
   state = 0
   ErrorStart = 0
   ErrorStop = 0
   ErrorLevel = 0
   level = Oy
```

The algorithm only works if the ramp is not steeper than 45°, i.e., Ex−Ox>Gy. If it is not possible for this to be fulfilled by the application, the ramp may also be made to always fulfil the above inequality by an additional scaling S: Gy→Gy/S.

The algorithm may also be used for the pure generation of digital levels, i.e., 0, 1. In this case, Gy is only 1 and the ramp changes abruptly from 0 to 1 or vice versa.

FIG. 6 shows the circuit arrangement 4, wherein the circuit arrangement 4 has a module 5 for implementing the algorithm and a digital-to-analog converter 6, at the output of which the control signals TL for the TDI lines 2.1-2.n (see FIG. 1) are applied. The variables and register values V/R are fed back here from the output of module 5 to the input. The module receives, as further input values, the five initial values and the system frequency $f_S$ (system clock with system period $T_S$) as well as, if necessary, a reset signal. Lastly, the effect of the digital jitter on the period or control cycle will be explained.

In the case of uniform smearing, the degradation MTF is defined by:

$$MTF(k) = \operatorname{sinc}(\pi k \Delta x)$$

With $\Delta x$ the offset of the recording. If $\Delta x=0$ there is no desynchronization and the MTF is equal to 1 regardless of the frequency. In the case of $\Delta x=g$ with g being the ground sampling distance, this gives the Nyquist frequency of $$k_n = \frac{1}{2g}$$
$$MTF(k_n) = \operatorname{sinc}(\pi k_n g)$$
$$= \operatorname{sinc}\left(\frac{\pi}{2}\right) = \frac{2}{\pi} \approx 63.7\%$$

This is the known degradation of non-TDI sensors in the remote sensing sector.

In the case of a focal plane, the integration time is limited by the internal clock generation in the resolution. Clocks in the order of 10 ns to 40 ns are expected. This limits the accuracy of the CCD control signals.

In general, the following applies to the case of a uniform speed deviation with TDI sensors:

$$MTF(k) = \operatorname{sinc}(\pi k (v - v_D) T)$$

With T the real integration time, i.e., the number of TDI steps multiplied by the "real" line period $T_L$ as well as the object velocity v and the TDI velocity $v_D$. The line period corresponds here to the period of the control signals discussed previously.

$$MTF(k) = \operatorname{sinc}(\pi k (v - v_D) N T_L)$$

The velocities may now be expressed by the line period (everything in the detector plane):

$$MTF(k) = \operatorname{sinc}\left(\pi k p \left(\frac{1}{T_L} - \frac{1}{T_D}\right) N T_L\right)$$
$$MTF(k) = \operatorname{sinc}\left(\pi k p \left(1 - \frac{T_L}{T_D}\right) N\right)$$

With p the pixel pitch and $T_D$ the adjustable line period. Due to the limitation of the accuracy of the line period, the difference will not be cancelled out in most cases. The "real" line period $T_L$ may be expressed by the line period and a correction term:

$$T_L = T_D - \epsilon$$

Wherein $\epsilon$ is in the range of the cycle period of the FPA. This change results in $$MTF(k) = \operatorname{sinc}\left(\pi k p N \frac{\epsilon}{T_D}\right)$$

To ensure that the desynchronization does not have a significant effect, the Sinc term should not be greater than 0.1 (TBC). This results in the following for $\epsilon$:

$$\frac{\epsilon}{T_D} < 0.1 \frac{2}{\pi N}$$

With N=256, the maximum TDI steps, the limit would be 2.5 E-4. Together with the maximum line frequency of, e.g., 150 kHz, i.e., a line period of 6.6 µs, this results in an accuracy of less than 1.6 ns. This is not technically feasible in the FPGA.

Therefore, a method is proposed in which the line period $T_D$ is not fixed. Instead, the period is varied from cycle to cycle so that the total error e always remains smaller than one system period. In a simplified model, it may be assumed that the offset $\Delta x$ is made up of many, not necessarily identical, offsets of the individual cycles. This results in $$MTF(k) = \operatorname{sinc}(\pi k \Delta x)$$
$$MTF(k) = \operatorname{sinc}(\pi k (\Delta x_0 + .. + \Delta x_k))$$
$$MTF(k) = \operatorname{sinc}(\pi k ((v - v_{D0}) + ... + (v - v_{Dk})) T_L)$$
$$MTF(k) = \operatorname{sinc}(\pi k (Nv - (v_{D0} + ... + v_{Dk})) T_L)$$
$$MTF(k) = \operatorname{sinc}\left(\pi k \left(Nv - p\left(\frac{1}{T_{D0}} + ... + \frac{1}{T_{Dk}}\right)\right) T_L\right)$$

The distribution of the $T_D$ is now carried out in such a way that these have the smallest possible deviation from the required line period on average over the N TDI steps. Nevertheless, a residual error of $\epsilon/N$ remains. This results in the following for the MTF:

$$MTF(k) = \operatorname{sinc}\left(\pi k \left(Nv - p\left(\frac{1}{T_L + \epsilon_1} + ... + \frac{1}{T_L + \epsilon_k}\right)\right) T_L\right)$$

Since $\epsilon$ is small compared to $T_L$ the result may be approximated by:

$$MTF(k) = \operatorname{sinc}\left(\pi k \left(Nv - \frac{p}{T_L}\left(1 - \frac{\epsilon_1}{T_L} + ... + 1 - \frac{\epsilon_k}{T_L}\right)\right) T_L\right)$$
$$MTF(k) = \operatorname{sinc}\left(\pi k p \left(N - N - \frac{\epsilon_1}{T_L} - ... - \frac{\epsilon_k}{T_L}\right)\right)$$
$$MTF(k) = \operatorname{sinc}\left(\pi k p N \frac{1}{T_L} <\epsilon>\right)$$

As already described above, the residual error of $$<\epsilon> \text{ is } \frac{\epsilon}{N}.$$

This results in:

$$MTF(k) = \sin c\left(\pi k p \frac{1}{T_L}\epsilon\right)$$

To ensure that desynchronization does not have a significant effect, the sinc term should not be greater than 0.1. This results in the following for E:

$$\frac{\epsilon}{T_L} < 0.1 \frac{2}{\pi}$$

Regardless of the TDI step, a maximum line frequency of 150 kHz, i.e., a line period of 6.6 µs, results in an accuracy of better than 420 ns. This may be realized without any technical problems. With an acceptable MTF degradation of 1%, this value would fall to 42 ns, but this may still be realized in the FPGA.

With this approach, the resolution of the line period is no longer specified in multiples of the system period $T_S$, but by the system period $T_S$ divided by the TDI steps. This ensures that $<T_L>$ may be set with the desired accuracy.

EXAMPLE

TDI steps=256 at 100 MHz (10 ns). This means that the mean line period may be set with an accuracy of 39 ps. As expected, the integration time has an error of 10 ns at TDI-256.

If fewer TDI steps are now set in this system, however, the residual error remains at 10 ns. It is not possible to reduce it any further because this is the smallest physical resolution. It is possible to set a better accuracy, but the averaging only runs over the number of TDI steps, so that this would not result in an increase in accuracy.

In the worst case, TDI=1, the higher accuracy would be completely lost. The residual error over the integration time would again be 10 ns.

What is claimed is:

1. A time-delay integration (TDI) line sensor, wherein the TDI line sensor has n TDI lines, at least one readout electronics unit and a circuit arrangement for generating CCD control signals for the TDI lines, wherein a period of the CCD control signals is an integer multiple of a system period, wherein all TDI lines are controlled with the same CCD control signal, wherein the TDI line sensor is configured such that an optimum period of the CCD control signals is calculated on the basis of a relative velocity, wherein the optimum period is not an integer multiple of the system period, wherein the period of the CCD control signals is changed as an integer multiple of the system period during integration over all n TDI lines so that an arithmetic mean of the period of the CCD control signals over the n integration steps corresponds to the optimum period, wherein the change in the period of the CCD control signals over the n integration steps is limited to one system period.

2. The TDI line sensor according to claim 1, wherein the TDI line sensor is configured so as to calculate a period pattern over x integration steps, wherein the arithmetic mean value over the x integration steps corresponds to the optimum period, wherein the period pattern is applied repeatedly over the n integration steps.

3. The TDI line sensor according to claim 1, wherein the circuit arrangement is configured so as to additionally change an edge steepness of the CCD control signals, wherein the edge steepness is reduced as the period of the CCD control signals increases.

4. The TDI line sensor according to claim 1, wherein the circuit arrangement is configured so as to generate CCD control signals with linear edges.

5. The TDI line sensor according to claim 1, wherein the circuit arrangement is configured as an FPGA or as an ASIC.

6. The TDI line sensor according to claim 1, wherein a digital-to-analog converter is arranged at the output of the circuit arrangement.

7. A method for operating a time-delay integration (TDI) line sensor, wherein the TDI line sensor has n TDI lines, at least one readout electronics and a circuit arrangement for generating CCD control signals for the TDI lines, wherein a period of the CCD control signals is an integer multiple of a system period, wherein all TDI lines are controlled with the same CCD control signal, wherein the TDI line sensor calculates an optimum period of the CCD control signals on the basis of a relative velocity, wherein the optimum period is not an integer multiple of the system period, wherein the period of the CCD control signals is changed as an integer multiple of the system period during integration over all n TDI lines so that an arithmetic mean of the period of the CCD control signals over the n integration steps corresponds to the optimum period, wherein the change in the period of the CCD control signals over the n interpretation steps is limited to one system period.

8. The method according to claim 7, wherein the TDI line sensor calculates a period pattern over x integration steps, wherein the arithmetic mean value over the x integration steps corresponds to the optimum period, wherein the period pattern is applied repeatedly over the n integration steps.

9. The method according to claim 7 wherein, in addition, the circuit arrangement changes an edge steepness of the CCD control signals, wherein the edge steepness is reduced as the period of the CCD control signals increases.

10. The method according to claim 7, wherein the circuit arrangement generates CCD control signals with linear edges.

11. The TDI line sensor according to claim 2, wherein the circuit arrangement is configured so as to additionally change an edge steepness of the CCD control signals, wherein the edge steepness is reduced as the period of the CCD control signals increases.

12. The TDI line sensor according to claim 2, wherein the circuit arrangement is configured so as to generate CCD control signals with linear edges.

13. The TDI line sensor according to claim 11, wherein the circuit arrangement is configured so as to generate CCD control signals with linear edges.

14. The TDI line sensor according to claim 4, wherein the circuit arrangement is configured as an FPGA or as an ASIC.

15. The TDI line sensor according to claim 13, wherein the circuit arrangement is configured as an FPGA or as an ASIC.

16. The TDI line sensor according to claim 2, wherein a digital-to-analog converter is arranged at the output of the circuit arrangement.

17. The TDI line sensor according to claim 3, wherein a digital-to-analog converter is arranged at the output of the circuit arrangement.

18. The method according to claim 8, wherein, in addition, the circuit arrangement changes an edge steepness of the CCD control signals, wherein the edge steepness is reduced as the period of the CCD control signals increases.

19. The method according to claim 8, wherein the circuit arrangement generates CCD control signals with linear edges.

20. The method according to claim 18, the circuit arrangement generates CCD control signals with linear edges.

* * * * *